United States Patent
Perkins (10) Patent No.: US 7,072,888 B1
(45) Date of Patent: Jul. 4, 2006

(54) PROCESS FOR IMPROVING SEARCH ENGINE EFFICIENCY USING FEEDBACK

(75) Inventor: Alan Perkins, Northamptonshire (GB)

(73) Assignee: Triogo, Inc., New York, NY (US)

( * ) Notice: Subject to any disclaimer, the term of this patent is extended or adjusted under 35 U.S.C. 154(b) by 0 days.

(21) Appl. No.: 09/334,327

(22) Filed: Jun. 16, 1999

(51) Int. Cl.
*G06F 17/30* (2006.01)

(52) U.S. Cl. .................... 707/5; 707/3; 707/4; 707/10; 707/104

(58) Field of Classification Search ............... 707/3, 707/5, 1, 6, 10, 7, 104; 705/27; 341/20
See application file for complete search history.

(56) References Cited

U.S. PATENT DOCUMENTS

| | | | | |
|---|---|---|---|---|
| 5,446,891 A | | 8/1995 | Kaplan et al. ................. 707/2 |
| 5,490,587 A | * | 2/1996 | Fisher ......................... 707/10 |
| 5,761,497 A | * | 6/1998 | Holt et al. ..................... 707/5 |
| 5,794,237 A | * | 8/1998 | Gore, Jr. ....................... 707/5 |
| 5,799,304 A | | 8/1998 | Miller ........................... 707/7 |
| 5,864,840 A | | 1/1999 | Leung et al. ................... 707/2 |
| 5,864,871 A | | 1/1999 | Kitain et al. ............. 707/104.1 |
| 5,867,799 A | | 2/1999 | Lang et al. .................... 707/1 |
| 5,877,759 A | | 3/1999 | Bauer ......................... 709/317 |
| 5,881,232 A | | 3/1999 | Cheng et al. ............... 709/217 |
| 5,890,152 A | | 3/1999 | Rapaport et al. .............. 707/6 |
| 5,893,092 A | * | 4/1999 | Driscoll ......................... 707/5 |
| 5,952,942 A | * | 9/1999 | Balakrishnan et al. ........ 341/20 |
| 5,973,683 A | * | 10/1999 | Cragun et al. ............... 345/327 |
| 6,006,218 A | * | 12/1999 | Breese et al. ................... 707/3 |
| 6,014,665 A | * | 1/2000 | Culliss ........................... 707/5 |
| 6,029,161 A | * | 2/2000 | Lang et al. .................... 707/1 |
| 6,041,311 A | * | 3/2000 | Chislenko et al. ............ 705/27 |
| 6,105,023 A | * | 8/2000 | Callan ........................... 707/5 |
| 6,119,114 A | * | 9/2000 | Smadja ......................... 707/7 |
| 6,189,002 B1 | * | 2/2001 | Roitblat ......................... 707/1 |
| 6,202,058 B1 | * | 3/2001 | Rose et al. ................... 706/45 |
| 6,269,368 B1 | * | 7/2001 | Diamond ....................... 707/6 |
| 6,314,420 B1 | * | 11/2001 | Lang et al. .................... 707/3 |
| 6,327,590 B1 | * | 12/2001 | Chidlovskii et al. ........... 707/5 |
| 6,397,212 B1 | * | 5/2002 | Biffar ............................ 707/5 |
| 6,505,202 B1 | * | 1/2003 | Mosquera et al. ........... 707/10 |

FOREIGN PATENT DOCUMENTS

WO W95/29451 * 11/1995

* cited by examiner

Primary Examiner—Thuy N. Pardo
(74) Attorney, Agent, or Firm—David Fink (57) ABSTRACT

A process for refining the results of a query to an internet search engine database by the use of user feedback is disclosed. It is a method to allow a user to rate the relevancy of URLs returned for a specific query. The relevancy ratings for a specific query are combined by the internet search engine with data from a user profile of personal information defined by the user. The internet search engine can determine which items of data in the profile are common between users who have rated a query result highly. The search engine can then modify the search algorithm to return those URLs rated highly by users with common profile attributes. The benefit to the internet is more efficient searching and retrieval of information for users.

18 Claims, 3 Drawing Sheets

PROCESS FOR IMPROVING SEARCH ENGINE EFFICIENCY USING FEEDBACK

FIELD OF THE INVENTION

The present invention relates to the process of refining relevancy determination for Internet search engine databases, through the use of user feedback.

BACKGROUND OF THE INVENTION

An internet, including but not limited to, the Internet, intranets, extranets and similar networks, is a world-wide network of computers, where each computer is identified by a unique address. The addresses are logically subdivided into domains or domain names (e.g. ibm.com, pbs.org, and oranda.net) which allow a user to reference the various addresses. A web, including but not limited to the World Wide Web (WWW) is a group of these computers accessible to each other via a common communication protocol, or language, including but not limited to Hypertext Transfer Protocol (HTTP). Resources on the computers in each domain are identified with unique addresses called Universal Resource Locator (URL) addresses (i.e., http://www.ibm.com/products/laptops.htm). A web site is a destination on a web. A web site can be an entire individual domain, multiple domains, or even a single URL.

Web sites are comprised of different resources that can be of many types. Resources with a .htm or. html ending are text files, or pages, formatted in a specific manner called Hypertext Mark-up Language (HTML). HTML is a collection of tags used to mark blocks of text and assign meaning to them. A specialised computer application called a browser can decode the HTML files and display the information contained within. Other resources include images, audio, and video files. A hyperlink is a navigable reference in an HTML page to another resource on the WWW.

A means for searching an internet, including, but not limited to an internet Search Engine, is a web application that exists to help users locate information on the Internet. This is accomplished through the use of:

a) A database of web resources, which is continually developed and maintained. Examples of resources are web pages, web sites, images, digital audio and digital video; generally, any file or collection of files located on an internet.

b) Processes for searching the database of web resources. Such processes are typically a set of standard interface programs, including, but not limited to Common Gateway Interface (CGI) programs. These programs may be written in PERL, TCL, or any other language suitable for the task. These programs process data, pass the data to other server side programs if necessary, and return the appropriate response to the client computer.

c) A user interface that allows one to manipulate the database searching processes on the database. The user interface is typically an html form containing fields, which the user inputs data into. This data may be in a number of different forms; the most common of which are plain text, phrases, or Boolean expressions.

The main purpose of an internet search engine is to provide users the ability to query the database of internet content and to locate content that is relevant to the user's query. A user can visit the search engine web site with a browser and enter a query into a form (or page), including, but not limited to, an HTML page, provided for the task. The query may be in several different forms, but most common are words, phrases, or questions. The query data is sent to the search engine through a standard interface, including, but not limited to the Common Gateway Interface (CGI). The CGI is a means of passing data between a client, a computer requesting data or processing, and a program or script on a server, a computer providing data or processing. The combination of a form on a HTML page and a CGI script is an example of a script application; however, there are other examples of script applications. The search engine will inspect its database for the URLs of resources most likely to be relevant to the submitted query. The list of URL results is returned to the user, with the format of the returned list varying from engine to engine. The returned hyperlinks are typically sorted by relevance, with the most relevant resources near the top of the list.

Search engines follow a set of rules to determine the relevancy of a resource. The rules differ from search engine to search engine. In one common instance, the rules are based around the frequency and location of keywords on a page, where keywords are words and phrases derived from the query.

For example, a page containing keywords in its title is normally assumed to be more relevant than those without the keywords in the title. Similarly, a pages that recites keywords in the first few paragraphs of its body, or in headings on the page, are more likely to be relevant than pages that does not. Furthermore, if a page frequently recites a keyword, then that page is more likely to be relevant than a page that infrequently recites keywords. These exemplify the simple factors used by most search engines in determining frequency. Some search engines use different methods. For example, one search engine uses the amount a site owner has paid to "buy" a particular keyword as a factor for ranking relevancy of a web site. The more the site owner has paid, the higher their site will be ranked.

There are several U.S. patents that disclose methods for ranking resources, and in one case, implementing user feedback. These are discussed below.

U.S. Pat. No. 5,446,891 to Kaplan et al. discloses a system for adjusting hypertext links with weighted user goals and activities. Hypermedia links to other nodes are recommended by ranking a list in an order that depends on one or more user profiles. The implementation of user profiles for ranking a list is well known in the art. The Kaplan invention does not implement user feedback for ranking a list and does not employ an internet search engine.

U.S. Pat. No. 5,867,799 to Lang et al. discloses a method and apparatus for filtering a data stream. This invention implements an information filter apparatus that consists of various filters such as adaptive content filters, credibility filters and community filters. The described filter apparatus is not directed to a search engine known to those skilled in the art. Therefore, the invention is not directed to a known search engine. Rather, the filter apparatus is directed, if at any type of search engine, to a new non-real time search engine. This invention presents an article to a user from a data stream rather than from a database. The article, and its relevancy, is rated through the use of a proposed feedback profile from the user. A search request is transmitted to a network of users, who each make their own recommendations based on the request. These recommendations are pooled and weighted according to user profiles. This method attempts to improve the performance of a particular profile by modifying the user profiles based on feedback response.

The patent to Lang is problematic for several reasons. The invention does not rate a search engine's ability to propose articles in response to a particular query. Rather, the invention rates articles. Thus, an article has only one rating. There is a long felt need for a method and apparatus that rates query responses rather than rating articles. The present invention solves this long felt need.

Furthermore, the patent to Lang discloses the implementation of user interaction as a factor in determining relevancy. This method of ranking relevancy can cause undue delays since the ratings are transmitted in non-real time. There is a long felt need for enhancing relevancy ratings in real time search engines. The present invention solves this long felt need.

The current technology allows for the unfortunate circumstance of poor results being returned to users. By applying user profiles and user feedback, a search engine of higher quality could be constructed. A higher quality search engine would allow the ranking of a resource in response to a particular query to be determined both by keywords and by demographic data provided by the user. There is a long felt need for a method or apparatus that enhances a search engine's ability to create a database of resources and rank the resources by relevance in response to a particular user query. The present invention addresses this long felt need.

SUMMARY OF THE INVENTION

The present invention improves methods for determining the relevancy of a resource to a query. Specifically, to improve an internet search engine's methods for determining the relevancy of a resource to a user query. The present invention applies user ratings of a search engine's ability to propose appropriate resources and implements user profile information as a means of refining the method by which data is searched, evaluated for relevancy, and returned. The search engine user, having been directed to a particular resource in response to a specific query, is provided with a means of rating the appropriateness of that resource to that query.

Highly rated resources positively affect the future relevancy ranking of that resource in response to that query. Low rated resources may either negatively affect the relevancy ranking or cause no affect to the relevancy ranking. In short, users rate the appropriateness of a resource proposed by the search engine in response to a specific query, which in turn affects the search engine's relevancy ranking of said resource in response to said specific query.

Another object of the present invention is to tailor query results to specific users. The present invention provides a mechanism for registering a user's demographic and psychographic profile data with a search engine. Profiles may include information as to whether the user is a home or a business, geographic location, typical spending, etc. Users of varying demographic and psychographic profiles need and expect different information in response to particular queries. To properly account for these differences, users establish a profile, or a set of profiles, with the search engine. Once a profile is established, the information contained in said profile can be used in all searches to provide the most relevant list of resources in response to a particular query.

Another object of the present invention is to identify specific elements of a particular profile that are relevant to a particular query to increase the relevancy of query results. If a specific result for a particular query is rated highly by a group of users, then the profile information for each member of the group is examined to determine the demographic and psychographic data common to each member. When a user with similar profile information executes the same query, the results rated highly by the similar users are ranked higher, thereby increasing the potential relevancy of the results returned.

Other objects and features of the present invention will appear from the following description and appended claims, reference being had to the accompanying drawings forming part of this specification wherein like reference characters designate corresponding parts in the several views.

DETAILED DESCRIPTION OF THE PREFERRED EMBODIMENT

The present invention contains four main steps for refining the relevancy of returned resources in response to a particular query on an internet:

1. The means for creating or modifying a user profile record and the data contained therein.
2. The process of recording searches and correspondent rankings
3. The means of identifying the elements of the profile that are relevant.
4. The means of calculating and delivering the appropriate list of results.

Figure 3:
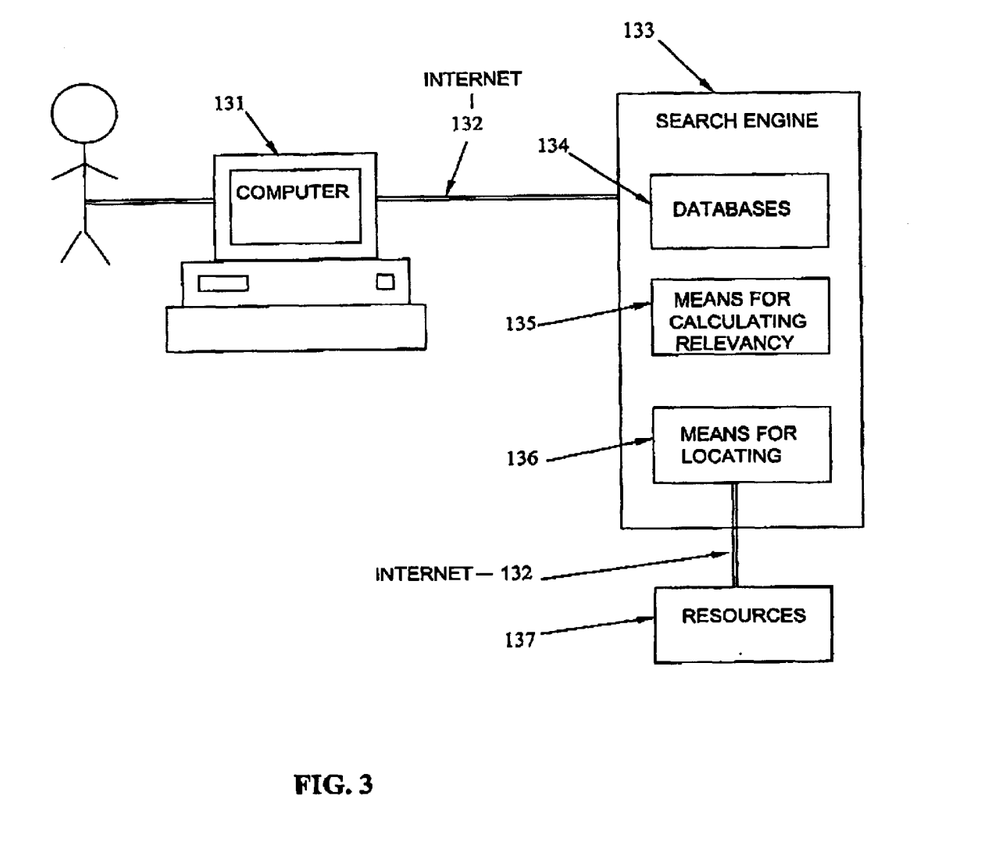
FIG. 3 illustrates the overall architecture of the apparatus and shows hardware and software that may be implemented in the present invention.

For better understanding of the four steps referenced above, it is useful to first examine the overall architecture of the apparatus. Refer to FIG. 3 for the overall architecture of the apparatus as well as an exemplary hardware environment implemented in the present invention. A user interacts with the apparatus to achieve the foregoing method. The user logs onto an internet 132, such as the Internet, through the use of connection hardware and software 131. In one embodiment, connection hardware and software may include a CPU and a means for inputting information. However, a multitude of connection hardware and software is commercially available, many of which may be implemented in the present invention. For example, connection hardware and software may include a personal computer (with a CPU), display, modem, mouse, keyboard, phone line and an Internet Service Provider. Another example of connection hardware and software may include a mobile phone (with a CPU) and an access provider (who provides service and connection to a user). The foregoing examples of connection hardware and software are merely a few examples of the multitude of connection hardware and software means that may be implemented to carry out the present invention. Accordingly, the present invention is not limited to these examples. Rather, the present invention may be carried out by many other similar connection hardware and software means. The user may access a search engine 133, or similar searching means, through the use of a browser, or other software, running across connection hardware and software. The user may perform a search by implementing keyboard, mouse or other hardware and software, which are components of connection hardware and software 131. Search engine 133 comprises a means for storing multiple databases 134, such as user profiles and user ratings. Search engine 133 further comprises a means for calculating relevancy 135 and a means for locating 136 many resources 137 on an internet 132, where one resource is shown in FIG. 3. Calculating means 135 runs script to accomplish calculations of relevancy. Means for locating 136 includes, but is not limited to, hyperlinks.

1. The Means for Creating or Modifying a User Profile Record and the Data Contained Therein.

The following is a description of the means and method implemented for creating or modifying a user profile record and the data contained therein for refining relevancy of returned resources.

In one embodiment, an Internet search engine contains a database Table of User Profiles. However, other means for searching an internet and other locations for storing a database Table of User Profiles may be used as well. Search engine scripts use the Table of Profiles to tailor search results to individual search engine users, as disclosed below. Search engine users may volunteer information through a web form which invokes search engine scripts to create, modify or delete the Table of Profiles. However, other means for creating, modifying or deleting the Table of Profiles may be used.

Before discussing the tables included herein, the following description contains various data structures consisting of fields of various data types which are known in the art of computer programming. The present invention implements these data types for the purpose of creating and improving user profiles and relevancy ratings of resources. Therefore the following data types are briefly described below, for the purposes of overview rather than reference.

| Type | Description |
| --- | --- |
| String | A sequence of characters |
| Integer | A whole number |
| Date | A data structure containing day, month and year fields |
| Table | A database table |
| Enum | An enumerated type |
| Record | An undefined data structure |
| Time | A data structure containing hours, minutes and seconds fields |
| Array | A data vector indexed by an integer offset into the vector |
| Associative array | A vector of (key, data) indexed by key |

The data structure below may be implemented as a minimum profile record for providing a basic description of the user in the Table of Profiles. However, data structures containing similar information may be also be used.

| Field | Type | Description |
| --- | --- | --- |
| Ident | String | A unique identifier for this profile |
| Date Last Used | Date | The date on which the profile was last used |
| Table of Searches | Table | The most recent searches (submitted queries) performed using this profile |

The above record may be augmented with the following fields to provide more data to the search engine so that the search engine's scripts can propose a list of resources of more relevance to a specific user. For example, the record man contain personal and/or business information pertaining to the user. However, other fields may be implemented as well.

| Field | Type | Description |
| --- | --- | --- |
| User name | String | The name of the user |
| Password | String | The password of the user |
| Email address | String | The electronic mailing address of the user |
| Usage | Enum (business, personal, both) | The modus operandi of the user. |
| Demographic / Psychographic Profile | Record | The Personal Profile record of the user, specific to personal (not business) use. |

The following demographic/psychographic profile record may be used to refine profile information. This profile contains data that is more useful and relevant to users conducting personal related searches. Search engine scripts can use this information to provide information tailored to the individual search engine user, as disclosed below. However, other profile records may also be used.

| Field | Type | Description |
| --- | --- | --- |
| Gender | Enum (M, F) | The gender of the user: male or female |
| Date of Birth | Date | The user's date of birth, from which their age can be obtained |
| Location | String(s) | Elements of the user's address: ideally the full address, but any of zip or postal code, city, state, country, would be useful |
| Occupation | String | Job title |
| Income | Integer | An indication of the income or spending power of the user |
| Table of likes | Table | The hobbies and interests of the user |
| Table of dislikes | Table | Aversions of the user |
| Date last modified | Date | The date the personal profile was last modified |

The following profile record may also be used to refine a profile record. This profile contains demographic and psychographic data that is more useful and relevant to user's conducting business-related searches. Search engine scripts can use this information to provide information tailored to the business of the search engine user, as disclosed below. However, other profile records may be used.

| Field | Type | Description |
| --- | --- | --- |
| Industry Type | Integer | Numerical Code Corresponding with Industry. |
| Location | String(s) | Elements of the business' address: ideally the full address, but any of zip or postal code, city, state, country, would be useful |
| Occupation | String | Occupation of the user(s) of this profile within the business |
| Turnover | Integer | The most recent turnover of the business |
| Profit | Integer | The most recent profit of the business |
| Date last modified | Date | The date the profile was last modified |

Information, such as user domain, can be automatically captured and stored in the user profile by the search engine. Users who do not provide information simply form another set of users, whose ratings can be used to determine the appropriateness of resources to that set. In general, however, the more detailed the information provided by the user to build their profile, the better the possibility that the results returned in response to a query will be highly relevant for that user. The user is provided with forms and scripts by the search engine in order to configure or modify their profile. The information the user inputs is submitted to a script using a form, and said script causes the updating of the search engine profile database with the new or modified data. The process of updating information with a database via a script is a common application and known in the art.

Figure 1:
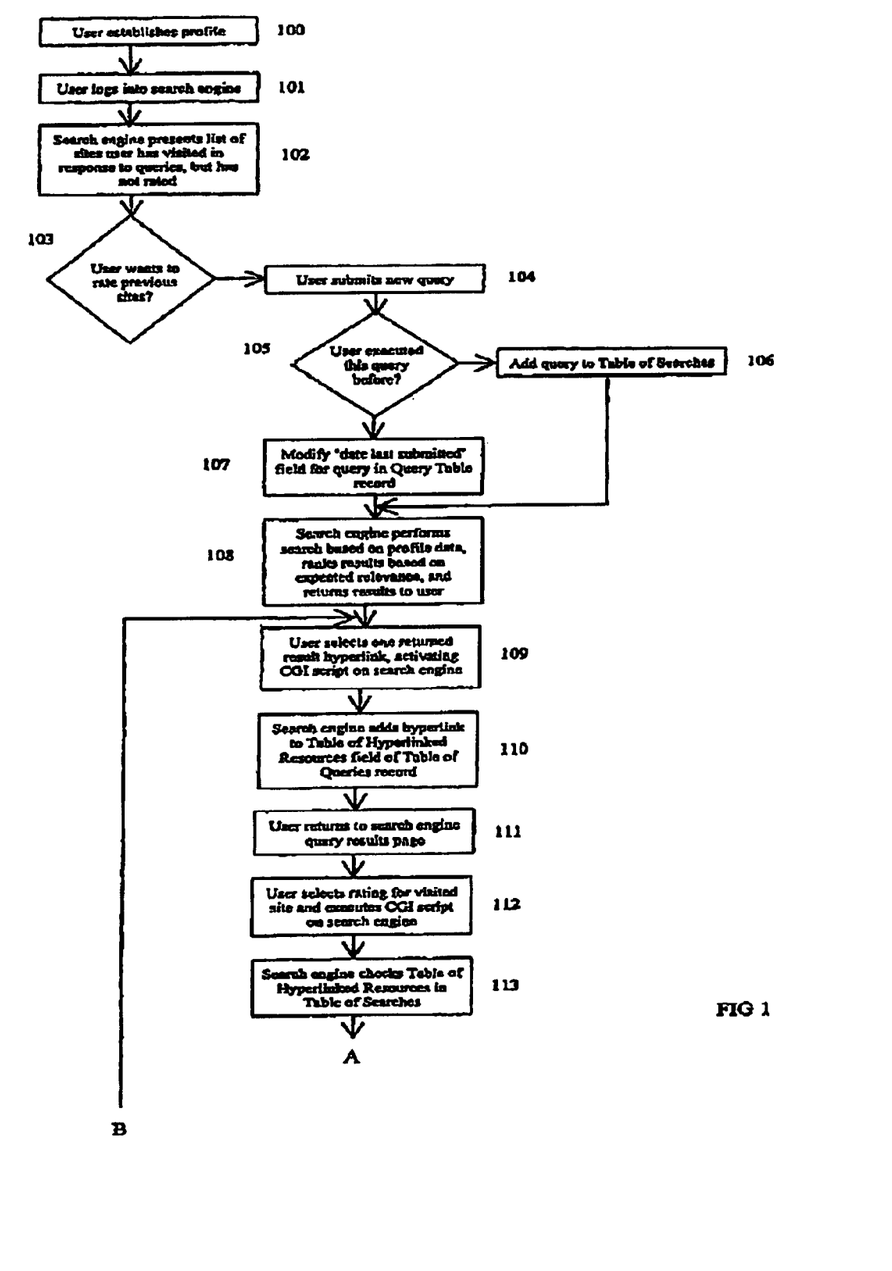
FIG. 1 is a logic flow chart illustrating the steps required to accept feedback from a user and alter the search engine relevancy ranking system.

Having created a profile (FIG. 1, 100), a user may modify the profile for several reasons. For example, the user may have committed an error in entering information, pyschographic and demographic pertaining to the user has changed or the user may decided that he or she does not want their profile to be used anymore. These are only some of the many reasons that a user may modify their profile. When the user logs into a search engine (FIG. 1, 101), the search engine presents a list of sites the user has visited in response the prior queries but has not rated (FIG. 1, 102). The search engine asks the user to rate the previously visited sites (FIG. 1, 103).

2. The Process of Recording Searches and Correspondent Rankings

The following is a description of the method and apparatus for recording user searches and user rankings of returned resources as a result of the search.

The Table of Searches is initially empty when the user profile is created (FIG. 1, 100). When a user submits a query to the search engine (FIG. 1, 104), the search engine either adds a new record to the table (FIG. 1, 105, 106), or updates an existing record in the database (FIG. 1, 105, 107). This is accomplished by the script that processes the user query and returns to the user a list of resources that match the query.

The Table of Searches field in the user profile record has the following format. However, the table of Searches field may comprise of other record formats.

| Field | Type | Description |
|---|---|---|
| Query | String | The text of the query submitted by the user |
| Date submitted | Date | The date on which the query was last submitted |
| Time submitted | Time | The time at which the query was last submitted |
| Table of Hyperlinked Resources | Table | The resources that the user has visited as a result of this query |

In response to a query, the search engine performs a search of the search engine database employing techniques known in the art, including, but not limited to, frequency and location of keywords, extended by this invention as disclosed below. The search engine provides the user with a web page listing resources that match the query (FIG. 1, 108), also known in the art. When the user hyperlinks to a resource (FIG. 1, 109), the hyperlink invokes a script to add the URL of said resource to the Table of Hyperlinked Resources in the Table of Searches record for that query in that user's profile (FIG. 1, 110). This is accomplished before linking to the requested resource. The user is then provided with a means to rate the relevance of the resource in relation to the original query entered by the user (FIG. 1, 1 12). Accordingly, the user rates the search engine's ability to propose resources in response to a particular query rather than rating the resource itself. The user ratings may be accomplished by several methods and means. Preferably, this is achieved by:

1. by integrating a form into the search engine query results page. This form allows previously visited query results to be rated (FIG. 1, 112), and either (a) another query result to be visited or (b) another page of query results to be displayed or (c) a new query to be entered, in a single operation by the search engine user, by submitting the form to a script. This form can be used when the user returns to the search engine results page (FIG. 1, 111) immediately after visiting a resource, through a "go back" operation on their web browser; or,
2. by integrating a form into the search engine home page. This form allows previously visited query results to be rated and a new query to be entered in a single operation by the search engine user, by submitting the form to a script. This form can be used when the user returns to the search engine some time (e.g. hours or days) after-visiting a resource.

Both forms, as referred to above, are generated by scripts that prevent the web pages containing the forms from being cached. This may be achieved by setting the "Pragma: no-cache" HTTP header field, as known in the art. Alternatively, this may be achieved by setting the "Expires" HTTP header field, as known in the art. Other embodiments may use different means to prevent caching. Other embodiments may allow caching.

In another embodiment, the rating system may be built in to the web browser. This allows users to provide ratings without having to return to the search engine web site. This embodiment requires tight integration between the web browser and search engine. For example, the web browser could detect when a user visited a resource in response to entering a query into the search engine; extend its interface to provide a means to rate that resource's relevancy to that query; and transmit that rating to the search engine.

Other embodiments may allow ratings to be given in different ways that suit the environment in which the invention is used. For example, some embodiments would be particularly suitable for an intranet, where the security of the rating mechanism need not be placed above the usability of the rating mechanism. In this embodiment, the rating mechanism can be provided in a pop-up window or a frame.

Figure 2:
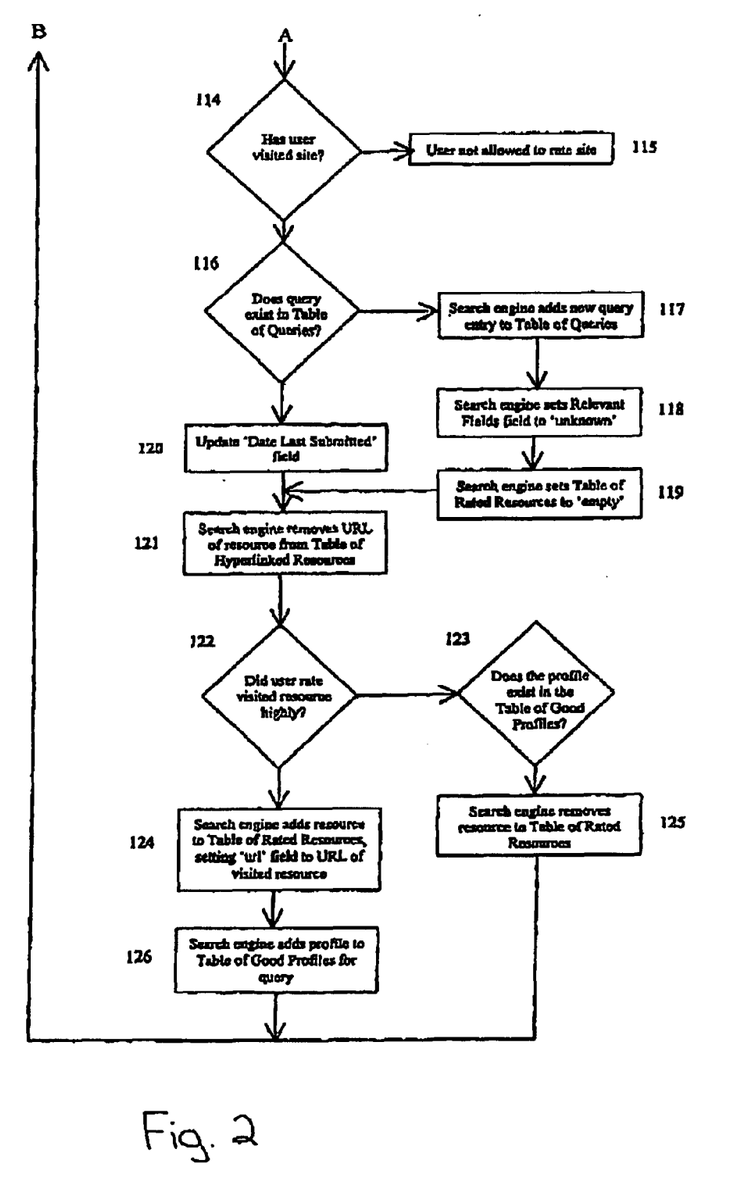
FIG. 2 is a continuation of the logic flow chart in FIG. 1.

The scripts review the Table of Hyperlinked Resources in the Table of Searches (FIG. 1, 113) using standard database techniques known in the art. If the user has not visited the resource (FIG. 2, 114) in response to a particular query, then the user is not allowed to rate the appropriateness of the resource to that query(FIG. 2, 115). If the user has visited the resource, then the search engine scripts inspect the Table of Searches (FIG. 2, 116) using standard database techniques known in the art. If the query does not exist in the Table of Queries, the search engine scripts add a new query entry to the Table of Queries (FIG. 2, 117), set the Relevant Fields field to 'unknown' (FIG. 2, 118), and set the Table of Rated Resources to 'empty' (FIG. 2, 119). If the query does exist in the Table of Queries, the 'Date Last Submitted' field is updated to the current date (FIG. 2, 120) by the search engine scripts. Once a resource has been rated by the user, the resource can be removed from the Table of Hyperlinked Resources for that query (FIG. 2, 121).

The search engine periodically performs cleanup tasks, using server-side scripts to remove information from the Table of User Profiles that is no longer needed or has not been used in a specified amount of time. The schedule for performing clean up tasks is determined by the search engine manager. The search engine determines for each profile if the age of a profile (i.e., Today's date—value of profile record's Date Last Used field) is above a threshold level (e.g. 6 months). If so, the profile is removed from the Table of User Profiles using standard database techniques known in the art. For each entry in the profile's Table of Queries, if the time since the query was last submitted is greater than a specified threshold (e.g. 2 weeks), the query is removed from said profile's Table of Queries.

In addition, the user can remove his or her profile entry from the Table of User Profiles. This action is performed by the user with a script. The script is invoked from a web form provided for the purpose. It uses standard database techniques known in the art to delete the profile entry from the Table of User Profiles. In addition, the user can remove a query from a profile's Table of Queries. This action is performed by the user through a script. It uses standard database techniques known in the art to delete the query from the profile's Table of Queries. Alternatively, the script may be invoked from the same web form that allows users to rate resources visited in response to a particular query, with the form being extended to allow users to opt out. In another embodiment, the script is invoked from an interface element built in to the web browser. This embodiment requires tight integration between the web browser and search engine. Further embodiments may invoke the script in different ways.

3. The Means of Identifying the Elements of the Profile that are Relevant.

The following is a description of the means and apparatus implemented to identify elements of a user profile that are relevant to a particular search.

For a particular query, some fields of the profile record could be very relevant, whereas others could appear to have no bearing on a rating. The value of a particular field in the user profile may be important for a specific query, but it is unlikely that the value of the field will be important for all queries, since the reasons for rating a resource highly will vary across genres of resources. For example, some genres will be price sensitive, some will be location sensitive and some will be language sensitive. Importance of a particular field for a particular query is calculated by building a Table of Queries containing the profiles of users that have previously used the particular query.

The following record in the Table of Queries may be used. However, other similar records may also be used.

| Field | Type | Description |
| --- | --- | --- |
| Query | String | The text of the query submitted by the user |
| Date Last Submitted | Date | The date on which the query was last submitted |
| Relevant Fields | Associative array | The fields and their values in the user profile that are relevant to this query. |
| Table of Rated Resources | Table | The resources that the user has visited and rated highly as a result of this query. |

Using the above record format, the search engine scripts are able to determine that a query has been recently been entered; determine the most relevant resources in the search engine database of web resources that match the query for a particular user; and maintain the Table of Queries, using techniques disclosed below.

The Date Last Submitted field is used by the search engine to clean up old or obsolete records that are no longer needed. The search engine runs the cleanup process script weekly or monthly, removing queries not used in the previous n days (e.g. the previous thirty days).

The following record in the Table of Rated Resources may be used by the search engine scripts in order to determine the most relevant resources in the search engine database of web resources that match the query for a particular user, using techniques further described below. However, other records may be used.

| Field | Type | Description |
| --- | --- | --- |
| URL | String | internet location of the rated resource |
| Date last rated | Date | The date on which an entry was last added to the Table of Good Profiles |
| Table of Good Profiles | Table | Profiles of users that have rated the resource highly. |

There are many reasons for a user to rate a resource poorly in response to a particular query. For example, the resource could be on the subject of "car insurance" where the user's query was "home insurance"; or the resource could be only suitable for Americans, and the user could be British; or the resource could be written in Swahili, and the user may only speak French. There are fewer reasons for the user to rate a resource highly in response to a particular query. For example, the user may wish to buy car insurance in the UK, and the resource allows them to do exactly that. The user rates a resource using a web form. If the user rates the resources as highly relevant in response to a particular query(FIG. 2, 122), a search engine script (invoked by said web form) adds the resource to the Table of Rated Resources for that query in the Table of Queries. This is accomplished by setting the 'URL' field of the record to the internet address of the rated resource (FIG. 2, 124) and adding the profile to the Table of Good Profiles for the query (FIG. 2, 126) if the URL does not already exist in that table (FIG. 2, 123, 125). As the Table of Good Profiles for a particular query increases in size, the search engine can determine with more certainty which fields in the user profiles of those users who have rated the resource highly for this query are relevant to the query. The algorithm disclosed below examines each field in the profiles of each user that has rated the resource as "good" in response to a particular query. If a particular field's values match across a sufficient percentage (e.g. 80%) of all user profiles, that field is marked as a Relevant Field. This means that resource will receive a relevancy boost for all users whose selected profile's value in that field matches the Relevant Field when those users search using that particular query. The following algorithm describes the method for determining which fields are relevant to a rated resource. However, similar methods may be used.

For each entry in the Table of Queries
    Set the Relevant Fields field to NONE
    For each user profile entry in the Table of Good Profiles of the Table of Rated Resources
    For each field in the user profile entry
        If value of said field matches for a specified percentage of the entries in the Table of Good Profiles (e.g. 80% of the entries contain the value "New York, N.Y." in the Location field)
            Add (field name, field value) to Relevant Fields
        End If
    End For
    End For
    Set query table entry(relevant fields)=relevant fields
End For If the user rates a resource (using a web form ) as having low relevancy for a particular query, a search engine script (invoked by said web form) removes the user's profile from the Table of Good Profiles for that query in the Table of Queries if it already exists in that table (FIG. 2, 125). This is done using standard database techniques known in the art.

4. The Means of Calculating and Delivering the Appropriate List of Results.

The following is a description of the means and method for calculating and delivering an appropriate and relevant list of results to a user in response to a particular query.

As soon as the Relevant Fields field of the Table of Queries record for a particular query is set, the Table of Queries record for said query can be used as a factor in ranking of a resource in response to that query.

When a user next enters a specific query, search results are calculated using traditional methods, including, but not limited to, frequency and location. However, traditional methods of calculation do not include the incorporation of multiple user's ratings of resources in response to particular queries. If the query exists in the Table of Queries, the Table of Rated Resources for said query is searched. The calculated search results may be sorted based on varying information. In one embodiment, the calculated search results are sorted based on the following information:

1. Percentage of profiles in the Table of Good Profiles whose Relevant Fields values match those of the user,
2. The size of the Table of Good Profiles (resources rated highly by many users should be ranked higher than resources ranked highly by few users), and
3. The age of the rated resource (the age of a resource has significant bearing on how large the Table of Good Profiles can be. Old resources will tend to always outrank new resources that may be more relevant to a specific query if no account is made of the age of a resource.

As more users submit a specific query, the search engine becomes more certain as to which fields of a user profile are responsible for ranking resources highly. This data can be used by the indexing and searching systems of the search engine to further refine the process of retrieving results for users.

Frequently, a user does not immediately return to the search engine results page for a particular query after visiting links on that page. As previously described, the search engine keeps a record of all hyperlinked resources that a user has visited, but not rated. When the user next logs on to the search engine (FIG. 1, 100), the search engine can request that the user rates resources they visited but did not rate in previous sessions (FIG. 1, 101).

Many methods for calculating and presenting and appropriate list of results in response to a user query may be implemented. The algorithm disclosed below may be used for calculating relevancy of resources in the search engine database of web resources in response to a particular query using traditional methods, and displays the results of this calculation. If sufficient user ratings of resources in response to the particular query have been given, it also calculates relevancy of resources in the search engine database of web resources in response to the particular query according to the methods herein disclosed, and displays the results of both calculations. In one embodiment, the following method of calculating and presenting the appropriate list of results in response to a user query is used. However, other methods may be used.

```
Calculate search results using traditional methods such as
    frequency and location
If query exists in table of queries
    If table of queries(relevant fields < > none)
        Sort table of queries(table of rated resources) according
            to (percentage of rated resources(table of good
            profiles) whose relevant fields match user profile
            record, size of rated resource(table of good profiles),
            age of rated resource)
    End If
    Display a mix of results, incorporating sorted table of
        queries and results of traditional search method
Else
    Display results of traditional search method
End If
```

The search engine ranking system assigns varying weighting to user ratings depending on the number of ratings that have been given for a particular query. The more ratings given, the more accurate the information obtained by processing the ratings data is likely to be. Traditional ranking methods, including but not limited to frequency and location of keywords, are used until a sufficient number of users have rated a particular query. Users' ratings of resources in response to a particular query may be used once the search engine gathers this information. The user ratings are not allowed to dominate the ranking criteria for resources because newly added resources to the internet must be visited in order to be rated. If too much emphasis were placed on user ratings, established rated resources with many ratings would dominate the search engine ranking system. Therefore, newer resources would not be rated and listed in response to a particular query. To prevent this problem, the search engine results list contains two types of resources:

1. resources that match the user profile data as determined by the search engine rankings
2. resources that satisfy the search engine criteria using other methods such as frequency and location of keywords.

A user is not required to volunteer any information to establish a user profile in order to use a search engine. A profile may be established for users who enable cookies in their browser and have used the search engine at least one time. The browser allows the search engine to write data to the user's hard drive to establish the cookie file, using techniques known in the art of web site development. The profile not only contains information supplied by the user, but also contains information pertaining to the user's previous searches, resources visited and ratings of those resources. The search engine can 'guess' the information not provided by comparing the profiles users who have not volunteered information to the profiles of users who have volunteered information. A simple algorithm may be used to accomplish this. For example, a particular user who has not disclosed their gender rates a particular resource highly in response to a particular query. Among users who have disclosed their gender, ninety percent (90%) of those that rate the same resource highly in response to the same query are female, making gender a relevant field for that resource. The search engine can deduce, with a degree of certainty, that the user is female. This may be accomplished by programming a simple algorithm into the search engine. By performing similar examinations on a range of resources for which gender is a relevant field, this degree of certainty can be increased. By repeating this process on other sets of resources with different relevant fields, a complete user profile can be guessed to a degree of certainty. Therefore, users who use the search engine before registering a user profile may have a profile built for them (possibly without realising it). When the users volunteer information for their profile, they are actually augmenting their existing profile with this information.

The resource rating system is designed to make it impossible for a rogue resource owner to spam or present false or misleading information to the search engine because the content that the user views is the information that the user rates. It achieves this by using user feedback as a methodology for calculating relevancy. This prevents rogue resource owners using from using traditional spamming techniques (that involve presenting differing information to the search engine that that seen by the search engine users), since, as herein disclosed, it is the search engine users themselves that provide the means to calculate the relevancy of a resource in response to a particular query. There is the possibility of a rogue resource owner spamming this search engine by using the rating system itself, visiting the search engine numerous times with multiple profiles and rating their resources highly (and/or their competitors' resources poorly) in response to particular queries in an attempt to adversely modify the search engine's ranking of their resources in response to those queries.

The search engine may prevent this problem by permitting only those users with profiles, and therefore with cookies enabled, to rate sites. The profile mechanism tracks users based on information such as the domain from which the user originated. Restrictions may be placed on the number of ratings a user can make in a day, the number of times a user may rate a resource over a month and the number of times a resource may be rated in a day. In addition, user profiles are deleted as part of the search engine cleanup process. This prevents web site owners from spamming the search engine through the rating system. Where, appropriate, other methods may also be used to prevent spamming. In embodiments where spamming is not present, the method and apparatus will not attempt to prevent spamming.

The present invention is not limited in its application to the details of the particular arrangement shown, since the invention is capable of other embodiments. Also, the terminology used herein is for the purpose of description and not of limitation.

I claim:

1. A method for refining the calculation of relevance of a resource on an Internet, based on a query for relevant resources, through the user of user ratings, comprising the steps of:
    implementing a particular user query;
    displaying the results of user query to a user;
    permitting a user to review said results of said user query;
    terminating display of said results to the user;
    upon said termination of said display of results, subsequently providing to the user a questionnaire with at least one script using at least one form requesting active user feedback input from the user, and then,
    calculating the relevancy of a resource based on a particular query;
    rating, by multiple users, said calculation of relevancy of the resource;
    collecting said ratings from said multiple users; and
    incorporating said collected ratings into calculation of relevancy of the resource so that traditional calculation methods are refined and more accurate.

2. The method of claim 1, further comprising the steps of:
    creating multiple profiles per user and incorporating said multiple profiles per user into said calculation of relevancy of the resource.

3. A method for refining the calculation of the relevance of a resource on an Internet, based on a query for relevant resources, through the use of user ratings, comprisings the steps of:
    (a) executing a particular query from a user;
    (b) providing said user with a result, including at least said resource, from said query;
    (c) providing said user with a form generated by a script to enable said user to rate the relevance for said resource in relation to said query;
    (d) receiving from said user the rating of said resource;
    (e) subsequently, calculating the relevancy of said resource based on said rating;
    (f) repeating steps (a) to (e) for additional users and incorporating the ratings of said additional users into calculations of relevancy of said resource;
    whereby, traditional calculation methods of relevancy are refined and more accurate;
    further comprising the step of: calculating the relevancy of said resource further comprises the steps of: providing an internet search engine to each of said users, with said search engine performing said calculation of relevancy, said calculating based on traditional methods; formulating, through the use of said search engine calculated relevancy, a query result list of proposed resources to visit in response to the particular query;
    the step of rating the relevancy of a resource further comprises supplying said query result list to the said users; prompting each of said users to visit resources on said query result list and rate the respective resources visited in response to the particular query;
    the step of collecting said ratings further comprises gathering a set evaluations from each of said users who have rated said visited resources; and
    the step of incorporating said collected ratings further comprises modifying said calculation of said search engine relevancy for said visited resources particular query based on said set of evaluations.

4. The method of claim 3, further comprising the step of:
    providing each of said users, a means for creating multiple profiles including demographic and psycho graphic data;
    creating, by each of said users, said multiple profiles;
    providing, to each of said users, a means of selecting one profiles including demographic and psycho graphic data;
    creating, by each of said users, said multiple profiles;
    providing, to each of said users, a means of selecting one profile from said multiple profiles; and,
    selecting, by each of said users, said one profile prior to submitting a query.

5. The method of claim 4, said one profile comprises data for related searches made by respective users.

6. The method of claim 4, said one profile comprises data for business related searches.

7. The method of claim 4, further comprising the step of:
    combining said set of evaluations from users with said selected profiles of said users so that the relevancy rating system is further refined.

8. The method of claim 4, further comprising the step of modifying said multiple profiles for the purpose of updating information in said profiles.

9. The method of claim 8, said modifying step further comprises deleting said multiple profiles for the purpose of removing a selected user.

10. The method of claim 4, further comprising the step of modifying said one profile for the purpose of updating information in said profile.

11. The method of claim 10, said modifying step further comprises deleting said one profile for the purpose of removing one multiple profiles created by one of said users.

12. The method of claim 8, further comprising the step of recalculating, by said search engine, the relevancy of the resource in response to said modifying said multiple profiles.

13. The method of claim 9, further comprising the step of calculating, by said search engine, a new relevancy of the resource in response to said deleting said multiple profiles.

14. The method of claim 10, further comprising the step of recalculating, by said search engine, the relevancy of the resource in response to said modifying said one profile.

15. The method of claim 9, further comprising the step of calculating, by said search engine, a new relevancy of the resource in response to said deleting said one profile.

16. The method of claim 3, further comprising the step of implementing anti-spamming measures to prevent rogue feedback from adversely affecting said search engine relevancy rating system.

17. The method of claim 3, said step of gathering a set of evaluations from each of the multiple users who have rated said visited resources further comprises providing a web browser modified to accept user evaluations; and transmitting gathered evaluations to said search engine.

18. The method of claim 3, said step of gathering a set of evaluations from each of the multiple users who have rated said visited resources further comprises providing a first web form on the search engine home page;

providing a second web form on the search engine results page; and transmitting to said search engine, via said first web form and via said second web form, said gathered evaluations.

* * * * *